Figure 1:
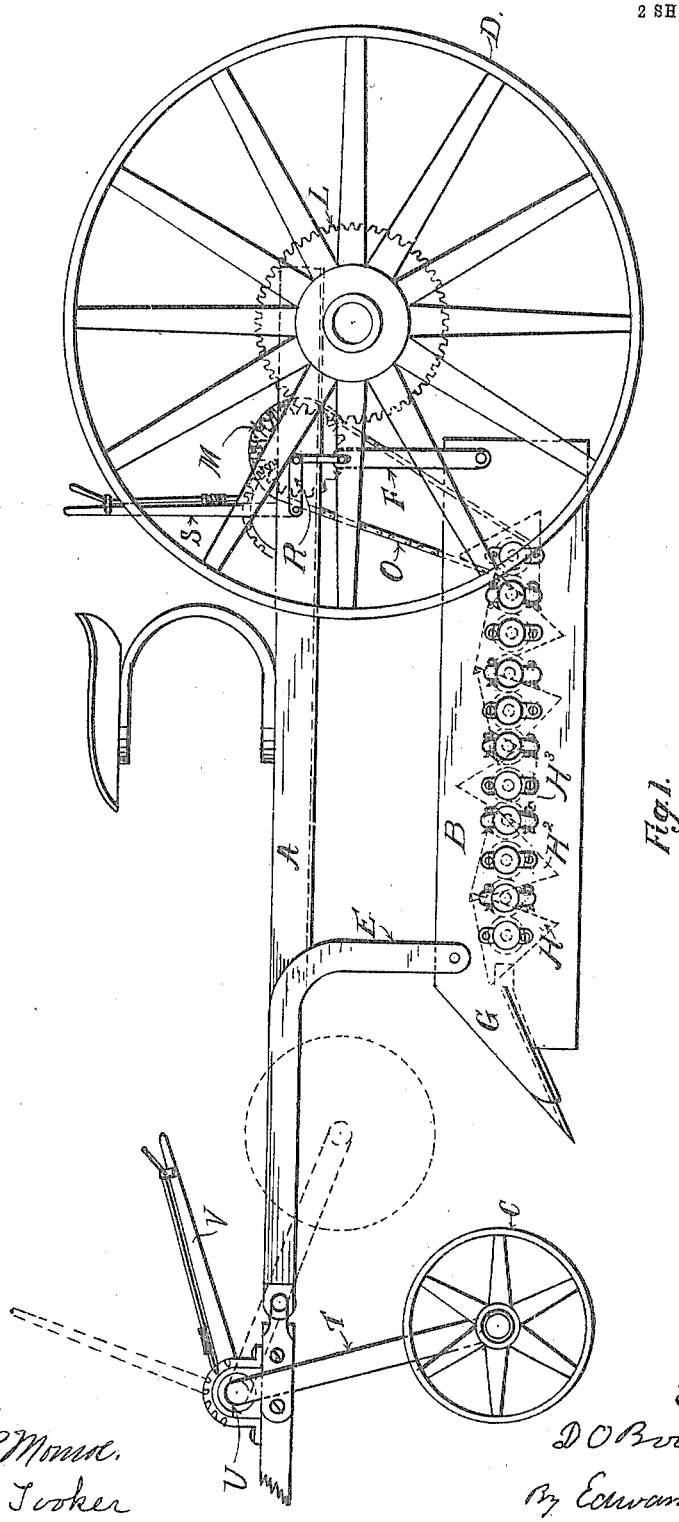

No. 812,007.  
PATENTED FEB. 6, 1906.  
D. O. BOWMAN.  
POTATO DIGGER.  
APPLICATION FILED JAN. 15, 1904.

2 SHEETS—SHEET 1.

Witnesses  
Edward R Mond.  
Mary S. Tooker

Inventor  
D O Bowman  
By Edward Taggart  
Attorney

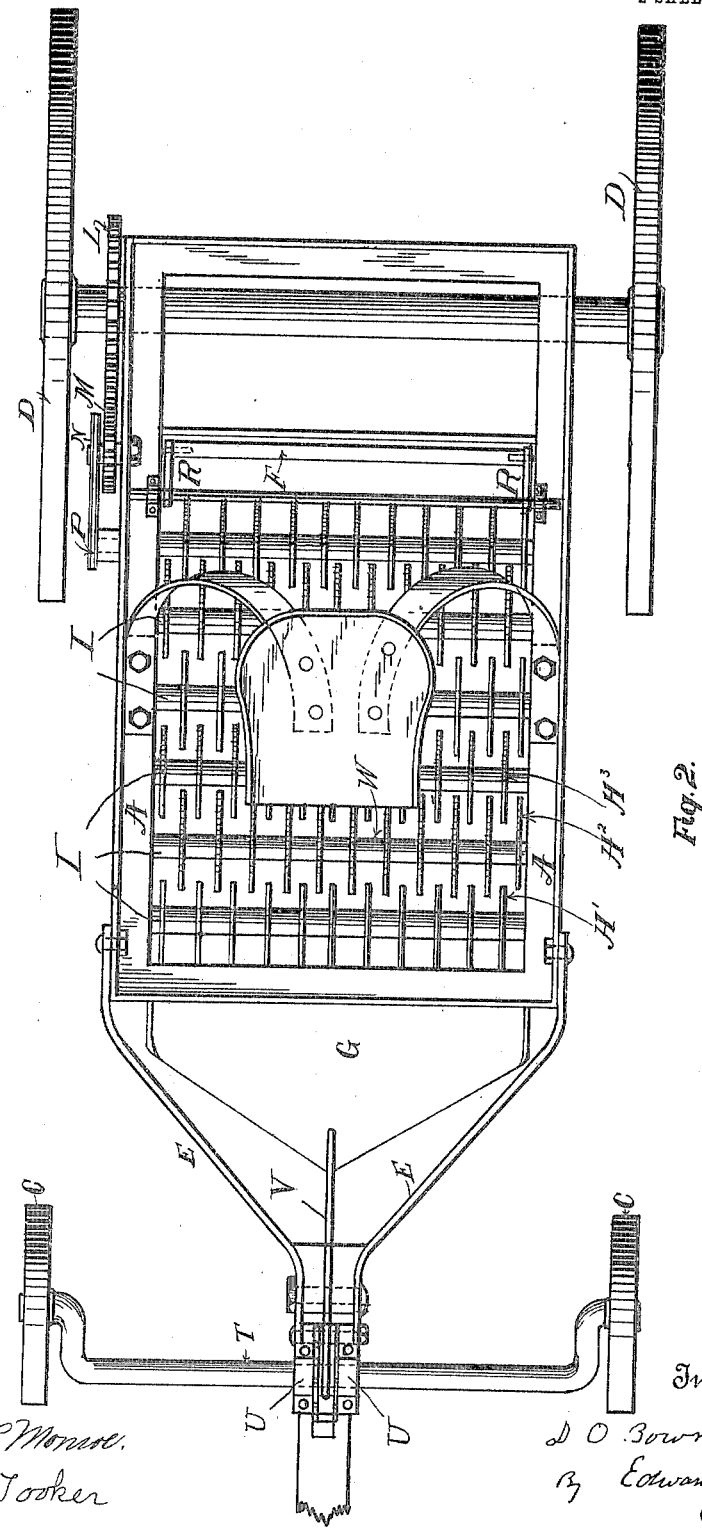

UNITED STATES PATENT OFFICE.

D. O BOWMAN, OF ROCKFORD, MICHIGAN.

POTATO-DIGGER.

No. 812,007.  Specification of Letters Patent.  Patented Feb. 6, 1906.

Application filed January 15, 1904. Serial No. 189,176.

*To all whom it may concern:*

Be it known that I, D O BOWMAN, a citizen of the United States, residing at Rockford, in the county of Kent and State of Michigan, have invented new and useful Improvements in Potato-Diggers, of which the following is a specification.

This invention relates to certain new and useful improvements in wheeled frames for potato-diggers and the like; and the invention relates to that class of wheeled frames operated by horse or other power.

The objects of the invention are, first, to furnish an adjustable frame for supporting a potato-digger or the like; second, to produce an adjustable frame that can be raised or lowered at various distances from the ground at the will of the operator.

Other objects are hereinafter more fully described.

These objects I accomplish by means of the mechanism illustrated in the accompanying drawings, in which—

Figure 1 shows a side elevation of a potato-digger constructed in accordance with my invention, illustrating the position of the separating-frame and the mechanism for raising and lowering the frame carrying the separators, also showing the position of the scoop or shovel which lifts the potatoes and dirt from the ground. Fig. 2 is a plan view of the digger, with the raising and lowering mechanism removed for the purpose of showing the relative position of the upper and lower frames.

In the drawings, A represents the upper frame and is constructed of steel or any suitable material. The upper frame connects the rear and front axles and constitutes the body of the carriage, which supports a potato-digging apparatus of any suitable construction.

B shows the lower frame, which supports the scoop or shovel and also the shafts and triangular dirt-separators, the whole being suitably supported beneath the upper frame.

C shows the front wheels mounted on a crank-shaped axle.

D shows the rear wheels mounted on a straight axle.

The frame B is supported at its front end by means of the beams E and at the rear end by the beams F, as shown in Fig. 1. The shovel or scoop on the front end of the frame B is shown by G. The triangular-shaped dirt-separators are placed in series, there being a row or series on each shaft and a series of shafts is shown, said triangular-shaped separators being illustrated in the drawings by H', H², and H³. The triangular dirt-separators are mounted on the shafts I.

M is a gear engaging with the gear L and revolved thereby. To the gear M is attached a sprocket N, which revolves with the gear M and is connected by the sprocket-chain O to the sprocket-wheel P, which sprocket-wheel is on one of the shafts I.

The lower frame B is raised and lowered in the following manner: Links R R connect the supporting-bar F to the lever S, said lever S being used for raising and lowering the rear end of the frame B. The lever S is provided with a quadrant and a spring-latch of the ordinary description and need not be described. The front end of the frame B is raised and lowered by means of turning the front axle (T showing the front axle) and mounted on which are the wheels C.

U shows the journals for the front axle, and V shows a lever for turning the front axle, which is crank-shaped, so as to raise and lower the wheels.

The dotted lines in Fig. 1 show the position of the front wheels and the lever V when the front end or scoop end of the frame B is lowered.

Having thus described my invention, what I claim to have invented, and desire to secure by Letters Patent of the United States, is—

A frame comprising pivotal front and rear sections, wheels mounted on the latter, a U-shaped axle mounted on the front section in close proximity to the pivotal connection of the frame, and wheels supported thereby, a segment carried by the front section and forming a bearing for the U-shaped axle, and a lever having means for engaging the segment to lock the axle in a raised or lowered position.

In testimony whereof I have hereunto set my hand in presence of two subscribing witnesses.

D O BOWMAN.

Witnesses:
 EDWARD R. MONROE,
 EDWARD TAGGART.